Oct. 20, 1970    J. R. ALVEY    3,534,983

ELEVATABLE FIFTH WHEEL

Filed Aug. 2, 1968    2 Sheets-Sheet 1

INVENTOR.
JOSEPH R. ALVEY
BY
Wm R. Price
ATTORNEY 3,534,983
ELEVATABLE FIFTH WHEEL
Joseph R. Alvey, Henderson, Ky., assignor of one-third each to Roy E. Corbell and Rudy C. Bryant
Filed Aug. 2, 1968, Ser. No. 749,884
Int. Cl. B62d 53/08
U.S. Cl. 280—438                            3 Claims

ABSTRACT OF THE DISCLOSURE

Discloses an elevatable fifth wheel designed for tractors which (fifth wheel) may be elevated to a raised position for connection to the kingpin of a trailer and lowered into a recess in the bed deck of the tractor so as to be essentially flush with the bed deck. Discloses cams eccentrically mounted on shafts extending transversely across the bed deck and below the surface thereof which coact with a cam follower surface in the form of a plate on which the fifth wheel is rigidly secured to raise and lower said fifth wheel.

FIELD OF THE INVENTION

The present invention relates to vehicle structure, and more particularly to vehicle structure associated with the fifth wheel of a traction vehicle. In one of its aspects it relates to an elevatable fifth wheel for mounting a trailer onto a tractor having an essentially flat bed-deck.

DESCRIPTION OF THE PRIOR ART

Conventionally, tractors are provided with connecting means such as a fifth wheel upon which the front end of the trailer bears while the rear end of the trailer is supported by a rear axle and wheels. It is sometimes desirable to employ a tractor in service pulling a trailer and at other times as a truck or flatbed service. However, if a conventional tractor having a raised fifth wheel is employed in flatbed service, the raised fifth wheel extends above the bed deck of the tractor and therefore interferes with normal flatbed use. The broad concept of providing a fifth wheel, elevated, in one position, above the bed deck of the tractor and lowered, in another position, into a recess so as to be flush with the bed deck of the tractor, is broadly old, having been disclosed in U.S. Pat. 2,676,033 to Housh et al., and U.S. Pat. 3,066,956 to Colorigh. Nevertheless, such means as are disclosed in the above patents for raising and lowering the fifth wheel have not, insofar as I am aware, been accepted to any extent in the field. It is, of course, apparent that the means for elevating and lowering the fifth wheel must be very compact and that the mechanism must be of a rugged construction so as to withstand the heavy drawbar loads exerted by large trailers. Further, it is necessary to provide a mechanism which maintains the fifth wheel and the support means for the fifth wheel in parallel relation with the truck bed deck both in raised position and in lowered position.

SUMMARY OF THE INVENTION

According to this invention, the fifth wheel, rigidly secured to a vertically movable support means (which support means, in a preferred embodiment, is in the form of a plate), is moved from a first lowered position flush with the bed deck of a tractor to a second raised position above but parallel to the bed deck of a tractor. This is accomplished by means of a series of cams, preferably in the form of eccentrically mounted circular cams, mounted on a pair of synchronously movable transversely disposed shafts. In a preferred embodiment the two shafts are driven by means of a pair of sprockets and an endless chain trained over said sprockets. At each corner of said plate is disposed vertical upright posts securely fixed to the frame of said tractor, each post containing a vertical sliding slot into which a rod attached to the support plate is fixed so that the support plate and fifth wheel are anchored against undesired movement in a horizontal plane and are guided for vertical movement between said first and said second positions.

DESCRIPTION OF THE PREFERRED EMBODIMENT

Figure 1:
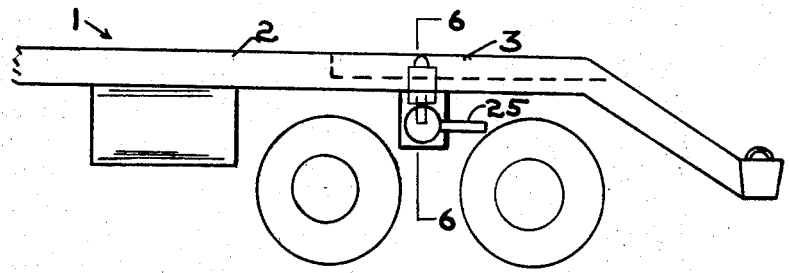
FIG. 1 represents a rear portion of a tractor with the fifth wheel shown in a lowered position flush with the bed deck of the tractor.
Figure 2:
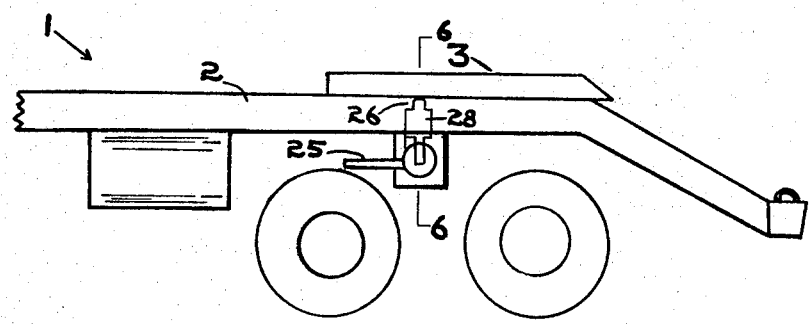
FIG. 2 is similar to FIG. 1 except the fifth wheel is shown in a raised position to receive complementary connecting means of a tractor trailer.
Figure 3:
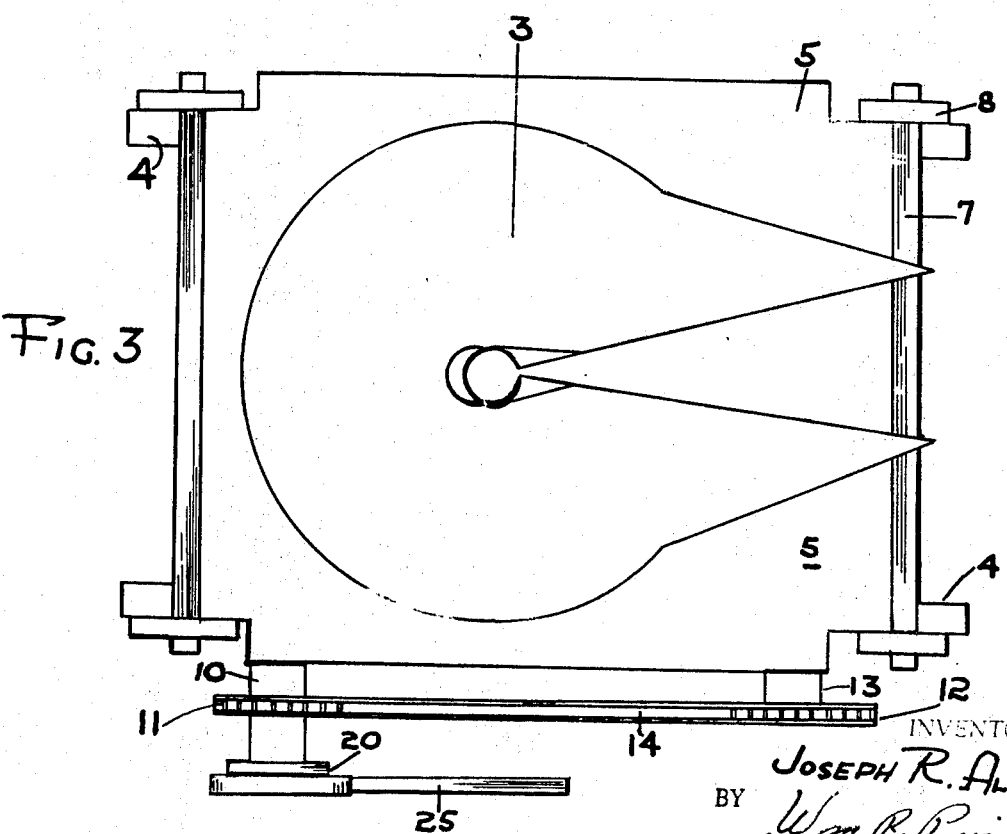
FIG. 3 is a fragmentary plan view illustrating the relation of the vertically movable support means to the fifth wheel and to the guide and anchoring means of this invention.
Figure 4:
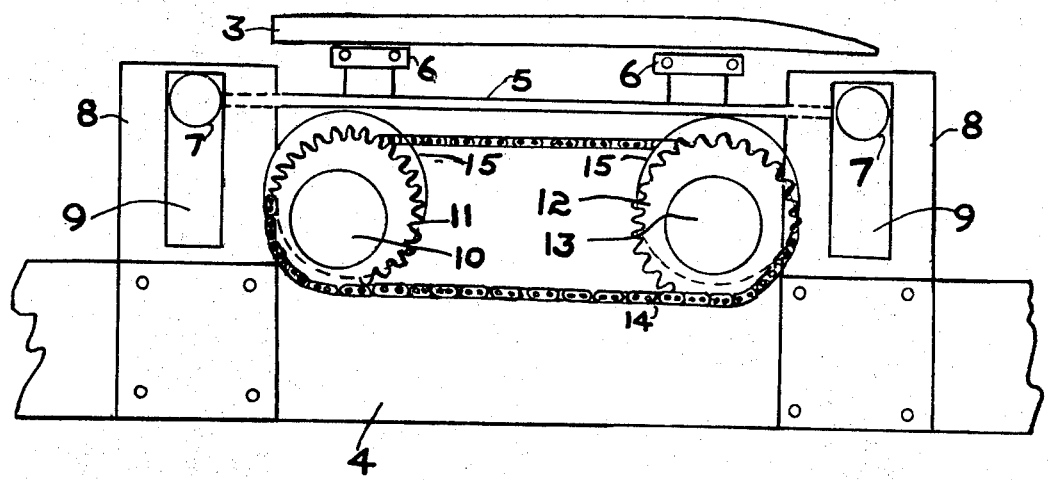
FIG. 4 is a side elevation illustrating the relation of the guide and anchoring means to the tractor frame.

Referring now to the drawings, the rear end of a tractor chassis is indicated generally by numeral 1, while the bed deck is indicated by numeral 2, and the fifth wheel is indicated by numeral 3. The chassis frame is indicated by numeral 4. The vertical movable support member or plate 5 is attached by support bracket 6 to the fifth wheel 3. At each end of support plate 5 are guide rods 7 which extend transversely across the truck bed deck 2 so as to ride in guide slots 9 of vertically disposed posts 8. It will be noted that each of the posts 8 are rigidly secured to the truck chassis frame 4 so as to anchor plate 5 through the median of guide rods 7 against undesired movement in a horizontal plane.

Figure 5:
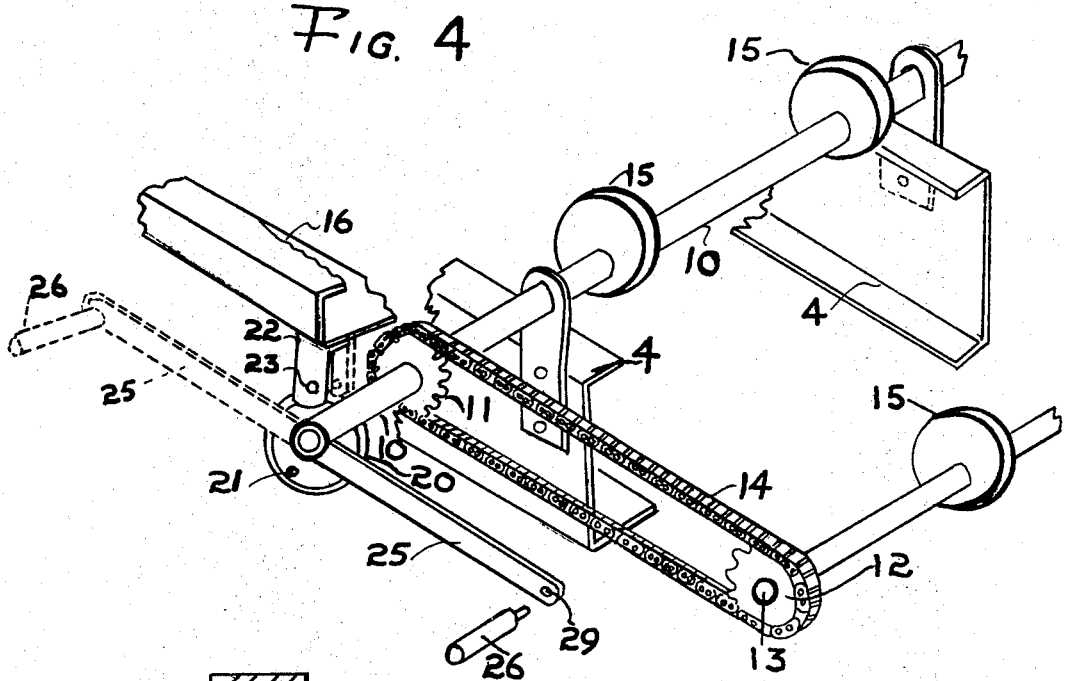
FIG. 5 is a view in perspective of the mechanism for moving the support means and fifth wheel vertically from a lowered position to a raised position.
Figure 6:
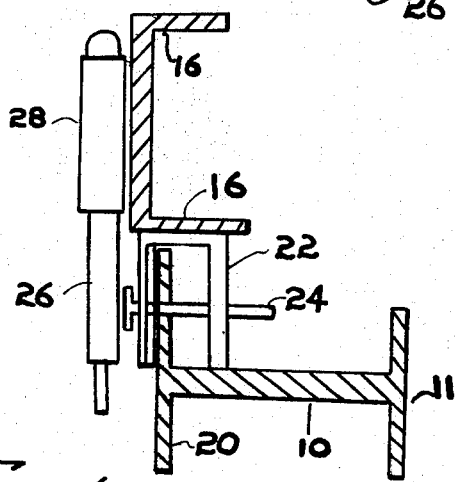
FIG. 6 is a vertical sectional view taken along line 6—6 of FIG. 1 illustrating the relation of the locking means of the invention.

The drive shaft 10 containing drive sprocket 11 is attached to driven sprocket 12 on driven shaft 13 by means of endless chain 14. Disposed on each of the shafts 10 and 13 are eccentrically mounted circular cams 15 which, as is shown, cooperate with the undersurface of plate 5 to raise the plate and the fifth wheel 3 secured thereto in a vertical position. The guide rods 7 sliding in slots 9 of vertical posts 8 maintain the plate 5 and the fifth wheel secured thereto in a parallel plane both in raised and lowered position and prevent the plate 5 and the fifth wheel 3 from moving in an undesirable horizontal plane. As is fragmentarily illustrated in FIG. 5, the outer frame 16 of bed deck 2 contains a bracket 22 welded thereto in proximity to drive shaft 10. At the end of drive shaft 10 is located a flange 20 which contain hole 21 which in certain positions of the shaft corresponds with hole 23 in bracket 22. Thus, as is illustrated in FIGS. 5 and 6, pin 24 can be inserted through hole 21 of flange 20 and hole 23 of bracket 22 to lock the shaft against movement in either the raised or lowered position of the cams 15. The plate 5 and fifth wheel 3 which move vertically responsive to the position of said cams 15 are therefore locked against vertical movement. A handle 25 is attached to the end of drive shaft 10 and a pin 26 normally held in bracket 28 on the side of the tractor bed deck is inserted into the hole 29 at the end of the handle 25 to serve as a hand piece. As is illustrated in FIG. 6, when the pin 26 is in position in bracket 28, pin 26 acts as a safety for pin 24 to prevent it from becoming disengaged from its position in holes 21 and 23 respectively.

Many modifications will occur to those skilled in the art, from the detailed description hereinabove given, which description is meant to be exemplary in nature and nonlimiting, except as to be commensurate in scope with the appended claims.

I claim:

1. Apparatus for use in connecting a tractor trailer, having a substantially horizontal bed deck, including in combination:
 (A) a fifth wheel, and,
 (B) mechanism for vertically moving said fifth wheel between a first position substantially level and parallel to said bed deck and a second position above and parallel to said bed deck, comprising:
  (1) a vertically movable support means for said fifth wheel, horizontally disposed below the surof said bed deck including means for securing said support means and said fifth wheel together in fixed and parallel relation;
  (2) cam means, in cooperation with said support means, to move said support means and said fifth wheel vertically between said first position and said second position, said cam means including:
   (a) a rotatable shaft extending transversely across the bed deck below the surface of said support means, and,
   (b) a circular cam, eccentrically mounted on said shaft,
   (c) a second shaft, extending transversely across said bed deck and below the surface of said support means;
   (d) a second circular cam, eccentrically mounted on said second shaft; and,
  (3) means for moving said cam means from a position corresponding to said first position to a position corresponding to said second position, including:
   (a) a linkage means, linking the shafts to rotate said shafts in synchronism, said linkage means including:
    a driving sprocket on one shaft, a driven sprocket on the other shaft, and an endless chain trained over said driving sprocket and said driven sprocket;
  (4) guide and anchoring members secured to the frame of said tractor and operative to anchor said support means and said fifth wheel against movement in a horizontal plane and to guide the vertical movement of said support means and said fifth wheel between said first and second position; and,
  (5) locking means for locking said mechanism in one of said positions.

2. Apparatus for use in connecting a trailer having a substantially horizontal bed deck, including, in combination:
 (A) a fifth wheel, and,
 (B) a mechanism for vertically moving said fifth wheel between a first position substantially level and parallel to said bed deck and a second position above and parallel to said bed deck, comprising:
  (1) a vertically movable support means for said fifth wheel, horizontally disposed below the surface of said bed deck including means for securing said support means and said fifth wheel together in fixed and parallel relation;
  (2) cam means operative, in cooperation with said support means, to move said support means and said fifth wheel vertically between said first position and said second position;
  (3) means for moving said cam means from a position corresponding to said first position to a position corresponding to said second position;
  (4) guide and anchoring means secured to the frame of said tractor and operative to anchor said support means and said fifth wheel against movement in a horizontal plane and to guide the vertical movement of said support means and fifth wheel between said first and second positions, said guide and anchoring members comprising:
   (a) vertically disposed posts rigidly secured to the frame of said tractor,
    (1) each of said posts containing a vertically oriented guiding slot,
    (2) at least one of said posts being located on either side of said vertically movable support means; and,
   (b) a guide rod fixedly secured to said vertically movable support means, the ends of said rod projecting through the vertically oriented slots of said posts on either side of said vertically movable support means;
  (5) locking means for locking said mechanism in one of said positions.

3. Apparatus for use in connecting a tractor trailer, having a substantially horizontal bed deck including, in combination:
 (A) a fifth wheel, and,
 (B) mechanism for vertically moving said fifth wheel between a first position substantially level and parallel to said bed deck and a second position above and parallel to said bed deck, comprising:
  (1) a vertically movable support means for said fifth wheel, horizontally disposed below the surface of said bed deck including means for securing said support means and said fifth wheel together in fixed and parallel relation;
  (2) cam means operative, in cooperation with said support means, to move said support means and said fifth wheel vertically between said first position and said second position, said cam means including:
   (a) a rotatable shaft extending transversely across said bed deck below the surface of said support means, and,
   (b) a circular cam eccentrically mounted on said shaft;
  (3) means for moving said cam means from a position corresponding to said first position to a position corresponding to said second position;
  (4) guide and anchoring means secured to the frame of said tractor and operative to anchor said support means and said fifth wheel against movement in a horizontal plane and to guide the vertical movement of said support means and fifth wheel between said first and second position; and, (5) locking means for locking said mechanism in one of said positions, said locking means comprising:
  (a) a flange, fitted on the end of said shaft,
    (1) a hole on the side of said flange and extending through the body of said flange,
  (b) a bracket, welded onto the other frame member of said bed deck in proximity to said flange;
    (1) said bracket containing a hole;
  (c) a pin, mountable in the hole in said flange and in the hole of said bracket to lock the position of said shaft.

References Cited

UNITED STATES PATENTS

| | | | |
|---|---|---|---|
| 2,676,033 | 4/1954 | Housh et al. | 280—438 |
| 3,066,956 | 12/1962 | Colorigh | 280—438 |
| 3,117,804 | 1/1964 | Bistrom | 280—438 |

FOREIGN PATENTS

| | | |
|---|---|---|
| 1,235,509 | 5/1960 | France. |
| 733,459 | 4/1957 | Great Britain. |

LEO FRIAGLIA, Primary Examiner

U.S. Cl. X.R.

280—425